United States Patent
Gindorf et al.

(10) Patent No.: US 11,180,830 B2
(45) Date of Patent: Nov. 23, 2021

(54) γ, γ' COBALT BASED ALLOYS FOR ADDITIVE MANUFACTURING METHODS OR SOLDERING, WELDING, POWDER AND COMPONENT

(71) Applicant: SIEMENS AKTIENGESELLSCHAFT, Munich (DE)

(72) Inventors: Christian Gindorf, Krefeld (DE); Stefan Krause, Krefeld (DE)

(73) Assignee: SIEMENS ENERGY GLOBAL GMBH & CO. KG

( * ) Notice: Subject to any disclaimer, the term of this patent is extended or adjusted under 35 U.S.C. 154(b) by 432 days.

(21) Appl. No.: 16/007,243

(22) PCT Filed: Dec. 14, 2016

(86) PCT No.: PCT/EP2016/080989
§ 371 (c)(1),
(2) Date: Jun. 13, 2018

(87) PCT Pub. No.: WO2017/118547
PCT Pub. Date: Jul. 13, 2017

(65) Prior Publication Data
US 2019/0003017 A1    Jan. 3, 2019

(30) Foreign Application Priority Data
Jan. 8, 2016    (DE) .............. 10 2016 200 135.3

(51) Int. Cl.
| | |
|---|---|
| *C22C 19/07* | (2006.01) |
| *B22F 3/24* | (2006.01) |
| *B23K 35/30* | (2006.01) |
| *C22F 1/10* | (2006.01) |
| *C22C 1/04* | (2006.01) |
| *B33Y 70/00* | (2020.01) |
| *B23K 103/08* | (2006.01) |

(52) U.S. Cl.
CPC .............. *C22C 19/07* (2013.01); *B22F 3/24* (2013.01); *B23K 35/3046* (2013.01); *C22C 1/0433* (2013.01); *C22F 1/10* (2013.01); *B22F 2003/248* (2013.01); *B22F 2301/15* (2013.01); *B23K 2103/08* (2018.08); *B33Y 70/00* (2014.12)

(58) Field of Classification Search
CPC ....... C22C 19/00; C22C 19/07; C22C 1/0433; B22F 3/24; B22F 2301/15; B22F 2003/248; B23K 35/3046; B23K 2103/08; C22F 1/10; B33Y 70/00
See application file for complete search history.

(56) References Cited

U.S. PATENT DOCUMENTS

| | | | |
|---|---|---|---|
| 3,898,109 A | 8/1975 | Shaw | |
| 5,640,667 A | 6/1997 | Freitag et al. | |
| 2013/0206287 A1 | 8/2013 | Sato et al. | |
| 2015/0010428 A1* | 1/2015 | Hardy | C22F 1/10 420/586 |
| 2015/0054191 A1 | 2/2015 | Ljungblad | |
| 2016/0168662 A1* | 6/2016 | Hardy | C22C 1/0433 420/438 |
| 2016/0281194 A1 | 9/2016 | Gindorf et al. | |
| 2017/0342527 A1* | 11/2017 | Bauer | C22C 30/00 |

FOREIGN PATENT DOCUMENTS

| | | |
|---|---|---|
| CN | 103069028 A | 4/2013 |
| DE | 69622581 T2 | 2/2003 |
| DE | 112012006355 T5 | 1/2015 |
| DE | 102013224989 A1 | 6/2015 |
| EP | 1925683 A1 | 5/2008 |
| EP | 2532762 A1 | 12/2012 |
| EP | 2583784 A1 | 4/2013 |
| EP | 1207979 B1 | 6/2014 |
| EP | 2821519 A1 | 1/2015 |
| JP | H0432501 A | 2/1992 |
| JP | 2003527480 A | 9/2003 |
| JP | 2009228024 A | 10/2009 |
| JP | 2009228024 A * | 10/2009 |
| WO | 2015082518 A1 | 6/2015 |
| WO | WO 2015082518 A1 | 6/2015 |

OTHER PUBLICATIONS

Osaki et al. JP2009228024A, machine-generated English language text (Year: 2020).*
Japanese Office Action dated Sep. 2, 2019 for Application No. 2018-535360.
PCT International Search Report of International Searching Authority dated Mar. 21, 2017 corresponding to PCT International Application No. PCT/EP2016/080989 filed Dec. 14, 2016.

* cited by examiner

*Primary Examiner* — Steven J Bos
*Assistant Examiner* — Ricardo D Morales
(74) *Attorney, Agent, or Firm* — Schmeiser, Olsen & Watts LLP

(57) ABSTRACT

The invention relates to gamma, gamma'-cobalt-based alloys for additive manufacturing methods or soldering, welding, powder and component. By using a cobalt-based alloy based on Co-7W-7 Al-23Ni-2Ti-2Ta-12Cr-0.01B-0.1C-(0-0.1Si), an alloy that is especially well-suited for additive manufacturing methods or high-temperature soldering is proposed.

8 Claims, No Drawings

γ, γ' COBALT BASED ALLOYS FOR ADDITIVE MANUFACTURING METHODS OR SOLDERING, WELDING, POWDER AND COMPONENT

CROSS-REFERENCE TO RELATED APPLICATIONS

This application claims priority to PCT Application No. PCT/EP2016/080989, having a filing date of Dec. 14, 2016, based on German Application No. 10 2016 200 135.3, having a filing date of Jan. 8, 2016, the entire contents both of which are hereby incorporated by reference.

FIELD OF TECHNOLOGY

The following relates to a γ, γ'-cobalt-based superalloy which is employed in additive manufacturing (AM) processes or in soldering or welding of high-temperature components, a powder and component.

BACKGROUND

γ'-hardened nickel-based alloys are known from high-temperature use, for example in gas turbines. Nickel-based alloys are subject to hot gas corrosion and can be repaired only with difficulty because of their brittleness. In the case of cobalt-based alloys, it is known that they have better properties in this respect. However, a disadvantage here is the poorer mechanical properties due to an unstable γ' phase (Co, Ni)-3Ti.

A problem in respect of hot cracks is that these processes have to be carried out very carefully in the case of γ, γ'-hardened nickel-based superalloys.

New developments which lead to stabilization of the γ phase in the alloy system Co—Ni—W—Al—Ti—Ta—Cr show that the mechanical properties are comparable to those of the known γ-hardened alloy Ni738.

Additive manufacturing processes and soldering or welding are known and are also employed or developed for γ'-hardened nickel-based alloys.

SUMMARY

The aspect is achieved by a cobalt-based superalloy, for additive manufacturing processes, soldering or welding, which comprises at least, in percent by weight: 6-8% of tungsten (W), 6%-8% of aluminum (Al), 21%-25% of nickel (Ni), 1%-3% of titanium (Ti), 1%-3% of tantalum (Ta), 10%-14% of chromium (Cr), 0.005%-0.015% of boron (B), 0.05%-0.15% of carbon (C). A process for the additive manufacture of a component, wherein the alloy is used. A method for soldering or for welding, wherein an alloy is used. A powder comprising an alloy is disclosed. A component comprising at least an alloy as or produced by a process or method or by means of a powder is disclosed.

The cobalt-based superalloy, for additive manufacturing processes, soldering or welding, of is disclosed which comprises at least, in percent by weight: 7% of tungsten (W), 7% of aluminum (Al), 23% of nickel (Ni), 2% of titanium (Ti), 2% of tantalum (Ta), 12% of chromium (Cr), 0.010% of boron (B), 0.10% of carbon (C). The cobalt-based superalloy, for additive manufacturing processes, soldering or welding, can comprise at least, in percent by weight:
0.05%-0.15% of silicon (Si), in particular in percent by weight:
0.10% of silicon (Si).

The description presents only illustrative embodiments of the invention.

A precipitation-hardening cobalt-based alloy which can be employed in additive manufacturing and in soldering or welding is proposed.

An advantageous composition is
Co-7W-7Al-23Ni-2Ti-2Ta-12Cr-0.01B-0.1C-(0-0.1Si).

Owing to the alloying elements titanium (Ti), aluminum (Al), tantalum (Ta) and hafnium (Hf) in superalloys, the oxygen particle pressure has to be controlled precisely during processing.

The proportion of tungsten (W) is kept rather low because of the density.

The proportion of aluminum (Al) is kept rather low in order to reduce the weldability and oxidation susceptibility due to the γ' content.

The proportion of nickel (Ni) is kept high in order to broaden the stability range for the γ phase in the combination with chromium (Cr).

The proportion of titanium (Ti) is kept rather low because of the oxidation susceptibility.

The proportion of tantalum (Ta) is kept in the middle range, including in order to replace the proportion of tungsten (W) in the γ' phase and in order to strengthen the grain boundaries together with the elements boron (B) and silicon (Si).

The proportion of chromium (Cr) is kept high in order to ensure good oxidation resistance and hot gas corrosion resistance.

Boron (B), carbon (C) and/or silicon (Si) represent grain boundary strengtheners.

The alloy is preferably subjected to a two-stage heat treatment:
solution heat treatment at 1573° K,
γ' precipitation at 1173° K and
then grain boundary carbide precipitation at 1073° K and
a concluding aging heat treatment in order to achieve the precipitation of grain boundary strengtheners such as carbides, silicides.

A further advantageous heat treatment is solution heat treatment and precipitation of γ' in a two-stage heat treatment with temperatures of 1423° K and 1193° K.
These temperatures are approximate figures (+/−20° K).
At the end, a preferable heat treatment at 1073° K for boride precipitation is optionally conceivable but not absolutely necessary.

The alloy can be present in powder form and also be used as welding additive material. This powder can have ceramics or other admixtures as constituent.

In soldering, welding or in AM, an alloy of this type or a powder of this type is employed in order to produce components in part or in full.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:
1. A cobalt-based superalloy,
for additive manufacturing processes, soldering or welding,
which comprises in percent by weight:

7% of tungsten (W),
7% of aluminum (Al),
21%-23% of nickel (Ni),
2.5%-3% of titanium (Ti),
1%-3% of tantalum (Ta),
10%-14% of chromium (Cr),
0.010%-0.015% of boron (B), and
0.10%-0.15% of carbon (C).

2. A powder comprising the cobalt-based superalloy as claimed in claim 1.

3. A component comprising at least the cobalt-based superalloy as claimed in claim 1.

4. A process for heat treatment, in particular for the cobalt-based superalloy as claimed in claim 1, wherein the alloy is subjected to at least a two-stage heat treatment:
   solution heat treatment at 1573° K,
   γ' precipitation at 1173° K and
   then the grain boundary carbide precipitation at 1073° K and a concluding aging heat treatment to precipitate grain boundary strengtheners.

5. A process for heat treatment, in particular for the cobalt-based superalloy as claimed in claim 1,
   wherein the alloy is subjected to a solution heat treatment and precipitation of γ' in an at least a two-stage heat treatment 1423° K and 1193° K at the end optionally a heat treatment at 1073° K for boride precipitation.

6. The cobalt-based superalloy,
for additive manufacturing processes, soldering or welding, of claim 1
which comprises in percent by weight:
7% of tungsten (W),
7% of aluminum (Al),
23% of nickel (Ni),
2.5% of titanium (Ti),
2% of tantalum (Ta),
12% of chromium (Cr),
0.010% of boron (B), and
0.10% of carbon (C).

7. The cobalt-based superalloy,
for additive manufacturing processes, soldering or welding, of claim 1
which comprises in percent by weight:
0.05%-0.15% of silicon (Si).

8. The cobalt-based superalloy,
for additive manufacturing processes, soldering or welding, of claim 7
which comprises in percent by weight:
0.10% of silicon (Si).

\* \* \* \* \*